United States Patent
Weber et al.

(10) Patent No.: US 6,204,315 B1
(45) Date of Patent: Mar. 20, 2001

(54) NON-FLAMMABLE, THERMOPLASTIC MOLDED MATERIALS BASED ON POLYPHENYLENE ETHERS

(75) Inventors: Martin Weber, Maikammer; Robert Weiss, Kirchheim; Walter Heckmann, Weinheim; Roland Hingmann, Ladenburg; Hans-Joachim Hähnle, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/194,614
(22) PCT Filed: May 28, 1997
(86) PCT No.: PCT/EP97/02797
  § 371 Date: Nov. 30, 1998
  § 102(e) Date: Nov. 30, 1998
(87) PCT Pub. No.: WO97/45487
  PCT Pub. Date: Dec. 4, 1997

(30) Foreign Application Priority Data

May 30, 1996 (DE) .............................. 196 21 734

(51) Int. Cl.$^7$ .................................................... C08K 5/42
(52) U.S. Cl. ........................... 524/126; 524/139; 524/141
(58) Field of Search .................................. 525/68, 92 D, 525/142, 391; 526/307.8, 308; 524/126, 127, 141, 555

(56) References Cited

U.S. PATENT DOCUMENTS

| | | | |
|---|---|---|---|
| 2,694,692 | 11/1954 | Amos | 260/45 |
| 2,862,906 | 12/1958 | Stein et al. | 260/45 |
| 2,982,749 | 5/1961 | Friedrich | 260/23 |
| 2,990,381 | * 6/1961 | Meinel | 528/481 |
| 3,280,084 | 10/1966 | Zelinski et al. | 260/83 |
| 3,284,393 | 11/1966 | Vanderhoff | 260/29 |
| 3,383,435 | 5/1968 | Cizek | 260/874 |
| 3,637,554 | 1/1972 | Childers | 260/23 |
| 3,639,508 | 2/1972 | Kambour | 260/876 |
| 3,660,531 | 5/1972 | Lauchlan | 260/876 |
| 3,728,258 | * 4/1973 | Livingston | 525/68 |
| 3,985,830 | 10/1976 | Fetters et al. | 260/880 |
| 3,994,856 | 11/1976 | Katchman et al. | 260/42 |
| 4,091,053 | 5/1978 | Kitchen | 260/880 |
| 4,107,232 | 8/1978 | Haaf et al. | 260/876 |
| 4,128,602 | 12/1978 | Katchman et al. | 260/876 |
| 4,128,603 | 12/1978 | Katchman et al. | 260/876 |
| 4,151,333 | * 4/1979 | Lenke et al. | 526/307.8 |
| 4,360,618 | 11/1982 | Trementozzi | 524/141 |
| 4,405,753 | 9/1983 | Deets et al. | 525/68 |
| 4,414,342 | * 11/1983 | Falk et al. | 523/437 |
| 4,829,121 | * 5/1989 | Fong . | |
| 5,071,912 | * 12/1991 | Furuta et al. | 525/68 |
| 5,286,806 | * 2/1994 | Neff et al. | 524/555 |
| 5,539,050 | * 7/1996 | Fujii et al. | 525/68 |
| 5,559,185 | * 9/1996 | Abe et al. | 525/68 |
| 5,610,256 | * 3/1997 | Kato et al. . | |
| 5,726,268 | * 3/1998 | Sukamoto . | |

FOREIGN PATENT DOCUMENTS

| | | |
|---|---|---|
| 0081230 | * 6/1983 | (EP) . |
| 080666 | 6/1983 | (EP) . |
| 305764 | 3/1989 | (EP) . |
| 476366 | 3/1992 | (EP) . |
| 0530572 | * 3/1993 | (EP) . |
| 1477706 | 6/1977 | (GB) . |
| 1559262 | 1/1980 | (GB) . |
| 2060656 | 5/1981 | (GB) . |
| 83/01254 | 4/1983 | (WO) . |
| 87/00540 | 1/1987 | (WO) . |

OTHER PUBLICATIONS

Bottenbruch, L., *Tech. Pol. Blends*, Kunststoff Handbuch 3/2, Hanser Verlag, Munich 1993, p. IX–XI (contents).
Fried et al., *Poly. Eng. Sci.*, 22 (1982) pp. 705–718.
Illers et al., *Kolloid.*190(1), 1963, pp. 16–34.
Troitzsch, J., *Int. Plas. Flam. Hdbk.*, 346–351, 1990.
Ullmann's *Enz. of Techn. Chem.*, vol. 19, pp. 265–272, 273–275, Weinheim, 1980.

* cited by examiner

Primary Examiner—Veronica P. Hoke
(74) Attorney, Agent, or Firm—Keil & Weinkauf

(57) ABSTRACT

Flame-retardant thermoplastic molding materials containing

A) at least one polyphenylene ether,

B) at least one vinylaromatic polymer, and

C) at least one flameproofing agent furthermore comprise

D) as an antidrip agent, a high molecular weight polymer based on acrylamide having a viscosity of more than about 1.5 mpas, measured in 0.1% strength aqueous solution at 25° C., and are used for the production of fibers, films and moldings.

4 Claims, No Drawings

NON-FLAMMABLE, THERMOPLASTIC MOLDED MATERIALS BASED ON POLYPHENYLENE ETHERS

The present invention relates to flame-retardant thermoplastic molding materials based on polyphenylene ethers and vinylaromatic polymers having improved fire resistance and the use of the novel thermoplastic molding materials for the production of fibers, films and moldings.

Polymer blends comprising polyphenylene ethers (PPE) and vinylaromatic polymers are disclosed, for example, in U.S. Pat. Nos. 3,383,435; 4,128,602 and 4,128,603. Such molding materials are suitable for the production of shaped articles which have better heat distortion resistance than high impact polystyrenes (HIPS) which have not been blended with polyphenylene ethers. A detailed description of the properties of these polymer blends is also to be found in L. Bottenbruch, "Technische Polymer-Blends", Kunststoff Handbuch 3/2, Hanser Verlag, Munich, 1993.

An important advantage of the polymer blends comprising polyphenylene ethers and styrene polymers is that molding materials which are flame-retardant and are therefore used for many applications in the area of electrical engineering can be prepared by adding halogen-free flameproofing agents, phosphorus-containing compounds being particularly noteworthy. For electrical applications, in particular the testing of the flame retardants according to UL 94 (in J. Troitzsch, "International Plastic Flammability Handbook", page 346 et seq., Hanser Verlag, Munich, 1990) is critical. In this test, a flame is applied several times to vertically fastened test specimens, the test specimen heating up to a very great extent, which in many cases leads to the dripping of flaming polymer material and the ignition of the cotton wool pad mounted below the rod. This undesirable behavior is observed in particular when large amounts of flameproofing agents have to be used to achieve short burning times.

The problem of the dripping of flaming particles in the UL 94 test has long been known and is solved in industry generally by adding small amounts of Teflon as an antidrip agent (U.S. Pat. No. 4,107,232). As part of the efforts completely to avoid the use of halogen-containing compounds in thermoplastic molding materials, there is a need for effective halogen-free antidrip agents for flameproofed molding materials based on polyphenylene ethers and vinylaromatic polymers.

It is known from the prior art, for example, that the drip resistance of thermoplastic PPE/HIPS molding materials can be improved by adding high molecular weight polyethylene. Thus, EP 0550204 proposes, as an antidrip agent, ultrahigh molecular weight polyethylene having a weight average molecular weight of more than 100,000, in particular from 2 to 6 million.

Moreover, the prior art states that the dripping behavior of PPE/HIPS molding materials can be improved by adding high molecular weight polystyrene. For example, EP 0305764 describes the use of polystyrene having a weight average molecular weight of more than 400,000, and EP 0476366 describes the use of polystyrene having a molecular weight of more than one million.

However, the addition of high molecular weight polyethylene or high molecular weight polystyrene has disadvantages. As shown by a UL 94 test for the PPE/HIPS molding materials modified in this manner, these antidrip agents cause a substantial increase in the burning time.

It is an object of the present invention to provide a halogen-free antidrip agent which can be used in thermoplastic molding materials based on polyphenylene ethers and vinylaromatic polymers without their burning time being substantially impaired.

We have found, surprisingly, that this object is achieved by providing flame-retardant thermoplastic molding materials containing A) at least one polyphenylene ether, B) at least one vinylaromatic polymer and C) at least one flameproofing agent, which furthermore comprise D) as an antidrip agent, a high molecular weight polymer based on acrylamide and having a viscosity of more than about 1.5 mPas, measured in 0.1% strength aqueous solution at 25° C.

Preferably, the viscosity of the antidrip agent is from about 2 to 6, in particular from about 3 to 4.5, mPas.

Furthermore, the antidrip agent may contain up to 95, for example from about 10 to about 70 or from about 20 to about 50, % by weight of comonomer units other than acrylamide.

At least one compound selected from among acrylic acid, methacrylic acid, styrenesulfonic acid, ethylenesulfonic acid and the salts thereof, dimethylaminoethyl methacrylate, dimethylaminioethyl acrylate and hydrochlorides thereof and diallyldimethylammonium chloride may be used as a comonomer.

A preferred embodiment of the invention relates to a molding material containing A) from about 5 to about 97.5% by weight of polyphenylene ether, B) from about 1 to about 93.5% of styrenepolymer, C) from about 1 to about 20% by weight of a flameproofing agent, D) from about 0.5 to about 25% by weight of antidrip agent, E) from 0 to about 50% by weight of impact modifier, and F) from 0 to about 60% by eight of conventional additives.

Owing to the high efficiency of the polyacrylamide polymers used according to the invention, the mechanical properties of flame-retardant PPE/HIPS blends are moreover not impaired.

The present invention furthermore relates to the use of a molding material according to the above definition for the production of fibers, films and moldings, and fibers, films and moldings which were produced using these molding materials.

The polyphenylene ethers (Component A) contained in the novel molding materials are known per se. Polyphenylene ethers are contained in the novel molding materials in an amount of from about 5 to about 97.5, preferably from about 15 to about 87.5, in particular from about 20 to about 82, % by weight, based on the total weight of the molding material.

Component A comprises in particular compounds based on substituted, in particular disubstituted, polyphenylene ethers, the ether oxygen of one unit being bonded to the benzene nucleus of the neighboring unit. Polyphenylene ethers substituted in the 2- and/or 6-position relative to the oxygen atom are preferably used. Examples of substituents are halogen, such as chlorine or bromine, long-chain alkyl of up to 20 carbon atoms, such as lauryl and stearyl, and short-chain alkyl of 1 to 4 carbon atoms which preferably have no α tertiary hydrogen atom, e.g. methyl, ethyl, propyl or butyl. The alkyl radicals may in turn be monosubstituted or polysubstituted by halogen, such as chlorine or bromine, or by hydroxyl. Further examples of possible substituents are alkoxy, preferably of 1 to 4 carbon atoms, of phenyl which is unsubstituted or monosubstituted or polysubstituted by halogen and/or by $C_1$–$C_4$-alkyl according to the above definition. Copolymers of different phenols, e.g. copolymers of 2,6-dimethylphenol and 2,3,6-trimethylphenol, are also suitable. Mixtures of different polyphenylene ethers can of course also be used.

Examples of polyphenylene ethers which may be used according to the invention are poly(2,6-dilauryl-1,4-phenylene ether),
poly(2,6-diphenyl-1,4-phenylene ether),
poly(2,6-dimethoxy-1,4-phenylene ether),
poly(2,6-diethoxy-1,4-phenylene ether),
poly(2-methoxy-6-ethoxy-1,4-phenylene ether),
poly(2-ethyl-6-stearyloxy-1,4-phenylene ether),
poly(2,6-dichlor-1,4-phenylene ether),
poly(2-methyl-6-phenyl-1,4-phenylene ether),
poly(2,6-dibenzyl-1,4-phenylene ether),
poly(2-ethoxy-1,4-phenylene ether),
poly(2-chlor-1,4-phenylene ether),
poly(2,5-dibromo-1,4-phenylene ether).

Polyphenylene ethers substituted by alkyl of 1 to 4 carbon atoms are preferably used, such as poly(2,6-dimethyl-1,4-phenylene ether),
poly(2,6-diethyl-1,4-phenylene ether),
poly(2-methyl-6-ethyl-1,4-phenylene ether),
poly(2-methyl-6-propyl-1,4-phenylene ether),
poly(2,6-dipropyl-1,4-phenylene ether) and
poly(2-ethyl-6-propyl-1,4-phenylene ether).

For the purposes of the present invention, polyphenylene ethers are also to be understood as meaning those which have been modified with monomers, such as fumaric acid, maleic acid, maleic anhydride or citric acid.

Such polyphenylene ethers are described, inter alia, in WO 87/00540.

In particular, those polyphenylene ethers which have a weight average molecular weight $M_w$ of from about 8,000 to 70,000, preferably from about 12,000 to 50,000, in particular from about 20,000 to 45,000 are used in the compositions.

This corresponds to an intrinsic viscosity of from about 0.18 to 0.7, preferably from about 0.25 to 0.55, in particular from about 0.30 to 0.50, dl/g, measured in chloroform at 25° C.

The molecular weight distribution is determined in general by means of gel permeation chromatography (08×50 cm Shodex separation columns of type A 803, A 804 and A 805, using tetrahydrofuran as eluent at room temperature). The polyphenylene ether samples are dissolved in tetrahydrofuran under pressure at 110° C., 0.16 ml of a 0.25% strength by weight solution being injected.

The detection is effected in general using a UV detector. The calibration of the columns was carried out using polyphenylene ether samples whose absolute molecular weight distribution was determined by a GPC/laser light scattering combination.

The vinylaromatic polymer (component B) is contained in the novel molding materials in amounts of from about 1 to about 93.5, preferably from about 10 to about 82.5, in particular from about 15 to about 77.5, % by weight, based on the total weight of the molding material. The component B is a vinylaromatic polymer which is preferably compatible with the polyphenylene ether used. Both homopolymers and copolymers of vinylaromatic monomers of 8 to 12 carbon atoms, which are prepared in the presence of a rubber, are suitable. The rubber content is from about 5 to 25, preferably from about 8 to 17, % by weight, based on the weight of the component B.

High impact polystyrenes or copolymers of styrene and other vinylaromatic compounds are particularly suitable. Such high impact polystyrenes are generally known as HIPS and are for the most part commercially available. They have a viscosity number (VN) of the hard matrix of from about 50 to about 130, preferably from about 60 to 90, ml/g (0.5% strength in toluene at 23° C.).

Suitable monovinylaromatic compounds are styrenes alkylated on the nucleus or on the side chain. Examples are chlorostyrene, o-methylstyrene, p-methylstyrene, vinyltoluene and p-tert-butylstyrene. However, styrene alone is preferably used.

The homopolymers are generally prepared by the known mass, solution and suspension processes (cf. Ullmanns Enzyklopädie der techn. Chemie, Volume 19, pages 265 to 272, Verlag Chemie, Weinheim 1980). The homopolymers may have weight average molecular weights $M_w$ of from about 3,000 to 300,000, which can be determined by conventional methods. Examples of suitable comonomers for the preparation of copolymers are (meth)acrylic acid, alkyl (meth)acrylates where the alkyl radical is of 1 to 4 carbon atoms, acrylonitrile and maleic anhydride and maleimides, acrylamide and methacrylamides and their N,N- or N-alkyl-substituted derivatives where the alkyl radical is of 1 to 10 carbon atoms. Suitable examples of such $C_1$–$C_{10}$-alkyl groups include methyl, ethyl, n-propyl, isopropyl, n-butyl and tert-butyl and straight-chain or branched pentyl, hexyl, heptyl, octyl, nonyl and decyl. Depending on their chemical structure, the comonomers are present in the styrenepolymers in different amounts. The miscibility of the copolymer with the polyphenylene ether is critical with regard to the content of comonomers in the copolymer. Such miscibility limits are known and are described, for example, in U.S. Pat. No. 4,360,618, U.S. Pat. No. 4,405,753 and the publication by J. R. Fried and G. A. Hanna, Polymer Eng. Sci., 22 (1982), page 705 et seq. The copolymers are prepared by known processes which are described, for example, in Ullmanns Enzyklopädie der techn. Chemie, Volume.19, page 273 et seq., Verlag Chemie, Weinheim (1980). The copolymers generally have a weight average molecular weight ($M_w$) of from about 10,000 to about 300,000, which can be determined by conventional methods.

According to the invention, high impact polystyrene is preferably used as Component B.

The generally used processes for the preparation of high impact polystyrenes are mass or solution polymerization in the presence of a rubber, as described, for example in U.S. Pat. No. 2,694,692, and mass suspension polymerization processes as described, for example, in U.S. Pat. No. 2,862,906. Other processes can of course also be used, provided that the desired particle size of the rubber phase is established.

The novel molding materials contain, as a flameproofing agent (Component C), from about 1 to about 20, preferably from about 2 to about 19, and in particular from about 2.5 to about 18, % by weight of at least one flameproofing agent. For example, organophosphorus compounds of the general formulae (I), (II) and (III):

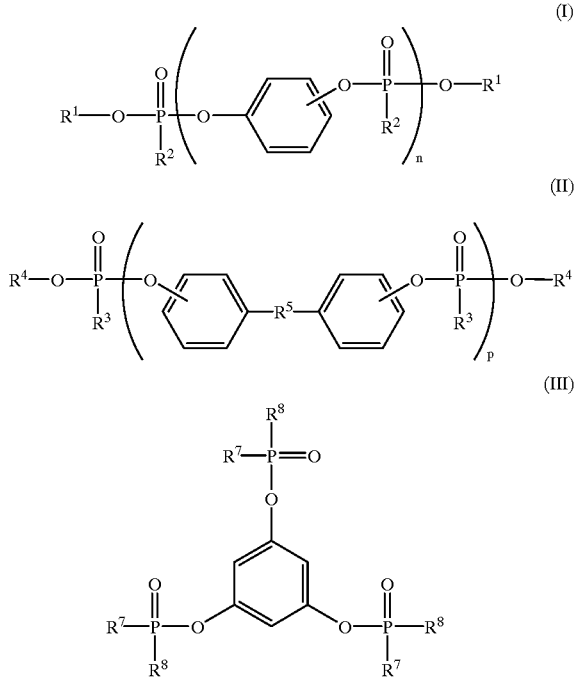

(I)

(II)

(III)

where
R¹ and R⁴, independently of one another, are each unsubstituted or substituted alkyl or aryl, R², R³, R⁷ and R⁸, independently of one another, are each unsubstituted or substituted alkyl, aryl, alkoxy or aryloxy, R⁵ is alkylene, —SO$_2$—, —CO—, —N=N— or —(R⁶)P(O)—

R⁶ is unsubstituted or substituted alkyl, aryl or alkylaryl and n and p, independently of one another, are each an integer from 1 to 30, are suitable.

Suitable substituents in compounds of the formulae (I), (II) and (III) are cyano, hydroxyl, $C_1$–$C_4$-alkyl and halogen, such as F, Cl, Br and I.

Preferred alkyl radicals in the compound of the formula (I), (II) and (III) are $C_1$–$C_{20}$-alkyl, in particular $C_1$–$Cl_2$-alkyl, e.g. methyl, ethyl, n-propyl, n-butyl, neopentyl, n-hexyl, n-octyl, n-nonyl, n-dodecyl, 2-ethylhexyl, 3,5,5-trimethylhexyl and cyanoethyl.

Preferred aryl radicals in the compound of the formulae (I), (II) and (III) are phenyl and naphthyl and monosubstituted or polysubstituted radicals, such as tolyl, xylyl, mesityl and cresyl.

Preferred alkylaryl radicals in the compound of the formulae (I), (II) and (III) are $C_1$–$C_{20}$-alkylaryl and in particular $C_1$–$C_{12}$-alkylaryl, the alkyl moiety and aryl moiety being defined as above.

Preferred cycloalkyl groups in the compound of the formulae (I), (II) and (III) include $C_3$–$C_{10}$-cycloalkyl, such as cyclobutyl, cyclopentyl, cyclohexyl and cycloheptyl.

Preferred alkoxy radicals in the compound of the formulae (I), (II) and (III) are $C_1$–$C_{20}$-alkoxy, $C_1$–$C_{20}$-alkyl moiety being defined as above.

Preferred aryloxy radicals in the compound of the formulae (I), (II) and (III) are those in which the aryl moiety is defined as above.

Preferred alkylene radicals in the compound of the formulae (I), (II) and (III) are $C_1$–$C_6$-alkylene radicals, such as methylene, ethylene, propylene and hexylene.

The preparation of phosphoric esters is described in Houben-weyl, "Methoden der organischen Chemie" Vol. XII/2, Thieme verlage [sic] 1972. The compounds C are preferably obtained by transesterification under base catalysis or by reaction of phosphoryl chloride with phenols, under catalysis by magnesium chloride or aluminum chloride.

Preferred products of the formula (I) are hydroquinone diphenyl phosphate or resorcinol diphenyl phosphate. Preferred products of the formula (II) are obtained by reacting a bisphenol (cf. for example Ullmann's Encyclopedia of Industrial Chemistry, 5th editon, Vol. A19, page 349), e.g. bisphenol A or S, with triphenylphosphate under base catalysis.

It should be noted that the industrially available products can usually be mixtures of different oligomers or isomers.

The novel molding materials can also contain the following compounds, individually or as a mixture, as Component C):

(IV)

where $R^a$, $R^b$ and $R^c$ are identical or different and are selected from hydrogen and straight-chain or branched, unsubstituted or substituted alkyl, aryl, alkylaryl or cycloalkyl groups of up to 40 carbon atoms.

Preferred alkyl radicals here are $C_1$–$C_{20}$-alkyl, in particular $C_1$–$Cl_2$-alkyl, e.g. methyl, ethyl, n-propyl, n-butyl, neopentyl, n-hexyl, n-octyl, n-nonyl, n-dodecyl, 2-ethylhexyl, 3,5,5-trimethylhexyl and substituted alkyl, e.g. cyanoethyl.

Preferred aryl radicals are phenyl and naphthyl and monosubstituted or polysubstituted radicals, such as tolyl, xylyl, mesityl and cresyl.

Preferred alkylaryl radicals are $C_1$–$C_{20}$-alkylaryl and in particular $C_1$–$C_{12}$-alkylaryl, the alkyl moiety and aryl moiety being defined as above.

Preferred cycloalkyl groups include $C_3$–$C_{10}$-cycloalkyl, such as cyclobutyl, cyclopentyl, cyclohexyl and cycloheptyl.

Suitable substituents are cyano, hydroxyl, $C_{1-4}$-alkyl and halogen, such as F, Cl, Br and I.

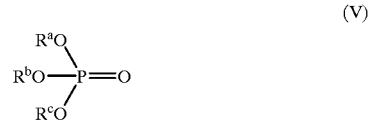

(V)

where $R^a$, $R^b$ and $R^c$ are identical or different and have the abovementioned meanings.

Examples of phosphine oxides of the formula (IV) are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl) phosphine oxide, benzylbiscyclohexylphosphine oxide, benzylbisphenylphosphine oxide and phenylbis(n-hexyl) phosphine oxide. Triphenylphosphine oxide, tricyclohexylphosphine oxide, tris(n-octyl)phosine oxide and tris(cyanoethyl)phosphine oxide are particularly preferably used.

Particularly suitable phosphates of the formula (V) are alkyl- and aryl-substituted phosphates. Examples are phenyl bisdodecyl phosphate, phenyl bisneopentyl phosphate, phenyl ethyl hydrogen phosphate, phenyl bis(3,5,5- trimethylhexyl phosphate) [sic], ethyl diphenyl phosphate, bis(2-ethylhexyl)-p-tolyl phosphate, tritolyl phosphate, trixylyl phosphate, trimesityl phosphate, bis(2-ethylhexyl) phenyl phosphate, tris(nonylphenyl) phosphate, bisdodecyl p-tolyl phosphate, tricresyl phosphate, triphenyl phosphate, dibutyl phenyl phosphate, p-tolyl bis(2,5,5-trimethylhexyl) phosphate. 2-Ethylhexyl diphenyl phosphate [sic]. Phosphorus compounds in which each of the radicals $R^a$, $R^b$ and $R^c$ is aryl are particularly suitable. Triphenyl phosphate, trixylyl phosphate and trimesityl phosphate are very particularly suitable. Furthermore, cyclic phosphates may also be used. Here, diphenyl pentaerythrityl diphosphate is particularly suitable.

Preferred mixtures of phosphine oxide and phosphate are: triphenylphosphine oxide/triphenyl phosphate or trixylyl phosphate, tricyclohexylphosphine oxide and triphenyl phosphate, tris(cyanoethyl)phosphine oxide and triphenyl phosphate, tris(n-octyl)phosphine oxide and triphenyl phosphate. Mixtures of a plurality of phosphine oxides and phosphates may also be used, for example the mixture of triphenylphosphine oxide, triphenyl phosphate and trixylyl phosphate.

The molecular weight is in general not more than about 1000, preferably from about 150 to about 800.

Furthermore, mixtures of the higher phosphates and monophosphates or monophosphine oxides in any ratio may be used.

The molding materials contain, as an antidrip agent (Component D), from about 0.5 to about 25, preferably from about 0.5 to about 20, in particular from about 0.5 to about 15, % by weight of a polymer based on acrylamide or copolymers based on acrylamide or copolymers based on acrylamide and up to 95% by weight of other monomer units. Novel antidrip agents may thus contain, for example, 5–100% by weight of acrylamide, for example 10–90, 20–70 or 40–60, % by weight. Comonomers may accordingly be present in an amount of 0–95, for example 10–90, 30–80 or 40–60, % by weight. Suitable comonomers are, for example, acrylic acid, methacrylic acid and the salts thereof, styrenesulfonic acid, ehtylenesulfonic [sic] acid and the salts thereof, dimethylaminoethyl methacrylate, dimethylaminoethyl acrylate and the hydrochlorides thereof and diallyl dimethylammonium chloride. Particularly preferred comonomer units are acrylic acid, sodium acrylate and dimethylaminoethyl acrylate hydrochloride. Sodium acrylate is particularly preferred.

The preparation of the polymers used as component D) is known to a person skilled in the art and is described in detail, for example, in Encyclopedia of Polymer Science and Engineering, Vol. 1, page 176 et seq., Wiley, N.Y. It can be carried out in dilute aqueous solution or as a reverse suspension polymerization.

In the polymerization in dilute aqueous solution, preferably 7–20% strength solutions are used. The polymerization can be carried out in batch reactors or in a continuously stirred kettle. Suitable initiators are azo and peroxo compounds or redox systems. The preferred polymerization temperature is from 20 to 80° C. Further information on the preparation is to be found found [sic] in Encyclopedia of Polymer Science and Engineering, Vol. 1, page 179 et seq., Wiley, N.Y.

In the reverse suspension polymerization, the water-soluble monomers are suspended in a suitable solvent, and the resulting droplets are then polymerized. Suitable solvents may be toluene, xylene and o-dichlorobenzene. Data for carrying out the reaction: time 10 min to 24 h Temperature: from 20 to 100° C. (depending on the initiator) Further information for carrying out the reaction can be obtained from U.S. Pat. Nos. 2,982,749 and 3,284,393.

High molecular weight products which have a viscosity of more than 1.5, preferably from 1.5 to 10, in particular from 2 to 7, mPas measured in each case in 0.1% strength aqueous solution, are preferably used. In addition to polyacrylamide homopolymers, in particular copolymers of acrylamide with from about 5 to about 95, preferably from 10 to 90, % by weight of sodium acrylate or dimethylaminoethyl acrylate hydrochloride are preferred. Such products are commercially available, for example, under the tradename Sedipur®. Suitable products are characterized by a weight average molecular weight of from 1 to 10,000,000 g/mol (light scattering).

The impact modifiers (Component E) used are rubber impact modifiers, in amounts of up to about 50, preferably up to about 25, in particular up to about 20, % by weight, based on the total weight of the molding material.

Natural or synthetic rubbers differing from Component B may be used as Component E. In addition to natural rubber, [lacuna] impact modifiers are, for example, polybutadiene, polyisoprene or copolymers of butadiene and/or isoprene with styrene and other comonomers which have a glass transition temperature, determined according to K. H. Illers and H. Breuer, Kolloidzeitschrift 190 (1) (1963), 16–34, of from about −100° C. to +25° C., preferably less than 0° C. Appropriately hydrogenated products may also be used.

Preferred impact modifiers E are block polymers of vinylaromatics and dienes. Impact modifiers of this type are known. German Published Applications DE-AS 1,932,234 and DE-AS 2,000,118 and German Laid-Open Application DE-OS 2,255,930 describe elastomeric block copolymers which have different structures and comprise vinylaromatic and diene blocks. The use of corresponding hydrogenated block copolymers, if required as a mixture with the unhydrogenated intermediate compound as impact modifiers is described, for example, in German Laid-Open Applications DE-OS 2,750,515, DE-OS 2,434,848 and DE-OS 3,038,551, EP-A-0,080,666 and WO 83/01254. The disclosure of the above publications is hereby expressly incorporated by reference.

In particular, vinylaromatic/diene block copolymers which can be used according to the invention are composed of blocks which contain a hard phase (block type S) and, as a soft phase, a B/S block which comprises diene and vinylaromatic units and has a random structure. The structure may, on statistical average, be homogeneous or inhomogeneous along the chain.

Such an elastomeric block copolymer suitable according to the invention is obtained by forming the soft phase from a random copolymer or by vinylaromatic with the diene; random copolymers of vinylaromatics and dienes are obtained by a polymerization in the presence of a polar cosolvent.

A block copolymer which can be used according to the invention may be represented, for example, by one of the following formulae (I) to (II):

(1) $(S-B/S)_n$;
(2) $(S-B/S)_n-S$;
(3) $B/S-(S-B/S)_n$;
(4) $X-[(S-B/S)_n]_m+1$
(5) $X-[(B/S-S)_n]_m+1$;
(6) $X-[(S-B/S)_n-S]_m+1$;
(7) $X-[(B/S-S)_n-B/S]_m+1$;
(8) $Y-[(S-B/S)_n]_m+1$;
(9) $Y-[(B/S-S)_n]_m+1$;
(10) $Y-[(S-B/S)_n-S]_m+1$;
(11) $Y-[(B/S-S)_n-B/S]_m+1$;

where

S is a vinylaromatic block,

B/S is the soft phase comprising a block randomly composed of diene and vinylaromatic units, X is a radical of n-functional initiator, Y is a radical of an m-functional coupling agent and m,n are natural numbers from 1 to 10.

A block copolymer of one of the formulae S-B/S-S, X-[-B/S-S]$_2$ and Y-[-B/S-S]$_2$ (meanings of the abbreviations as above) is preferred, and a block copolymer whose soft phase is divided into the blocks

(12) (B/S)$_1$-(B/S)$_2$;
(13) (B/S)$_1$-(B/S)$_2$-(B/S)$_1$;
(14) (B/S)$_1$-(B/S)$_2$-(B/S)$_3$;

where the indices 1, 2 and 3 represent different structures in the sense that the vinylaromatic/diene ratio in the individual B/S block is different or changes continuously within one block within the limits (B/S)$_1$(B/S)$_2$, the glass transition temperature $T_g$ of each part-block being less than 25° C., is particularly preferred.

A block copolymer which has a plurality of blocks B/S and/or S having a different molar mass per molecule is likewise preferred.

Furthermore, an S block composed exclusively of vinylaromatic units can be replaced by a B block since in general all that is important is that an elastomeric block copolymer is formed. Such copolymers may have, for example, one of the structures (15) to (18)

(15) B-(B/S)
(16) (B/S)-B-(B/S)
(17) (B/S)$_1$-B-(B/S)$_2$
(18) B-(B/S)$_1$-(B/S)$_2$.

Preferred vinylaromatics are styrene, o-methylstyrene, vinyltoluene or mixtures of these compounds. Preferred dienes are butadiene, isoprene, piperylene, 1-phenylbutadiene or mixtures of these compounds. A particularly preferred monomer combination is butadiene and styrene.

Soft blocks are particularly preferably composed of from about 25 to 75% by weight of styrene and about 25 to 75% by weight of butadiene. Soft blocks which contain from about 34 to 69% by weight of butadiene and from about 31 to 66% by weight of styrene are particularly preferred.

In the case of the monomer combination styrene/butadiene, the amount by weight of the diene in the total block copolymer is from 15 to 65% by weight and that of the vinylaromatic component is accordingly from 85 to 35% by weight. Butadiene/styrene block copolymers having a monomer composition comprising from 25 to 60% by weight of diene and from 75 to 40% by weight of vinylaromatic compound are particularly preferred.

The block copolymers are obtainable by anionic polymerization in a nonpolar solvent with the addition of a polar cosolvent. It is thought that the cosolvent acts as a Lewis base with respect to the metal cation. Preferably used solvents are aliphatic hydrocarbons, such as cyclohexane or methylcyclohexane. Preferred Lewis bases are polar aprotic compounds, such as ethers and tertiary amines. Examples of particularly effective ethers are tetrahydrofuran and aliphatic polyethers, such as diethylene glycol dimethyl ether. Examples of tertiary amines are tributylamine and pyridine. The polar cosolvent is added to the nonpolar solvent in a small amount, for example from 0.5 to 5% by volume. Tetrahydrofuran in an amount of from 0.1 to 0.3% by volume is particularly preferred. Experience has shown that an amount of about 0.2% by volume is sufficient in most cases.

The copolymerization parameters and the amount of 1,2- or 1,4-linkages of the diene units are determined by metering and structure of the Lewis base. The novel polymers contain, for example, from 15 to 40% of 1,2-linkages and from 85 to 60% of 1,4-linkages, based on all diene units.

The anionic polymerization is initiated by means of organometallic compounds. Compounds of alkali metals, in particular of lithium, are preferred. Examples of initiators are methyllithium, ethyllithium, propyllithium, n-butyllithium, sec-butyllithium and tert-butyllithium. The organometallic compound is added as a solution in a chemically inert hydrocarbon. The metering depends on the intended molecular weight of the polymer but as a rule is from 0.002 to 5 mol %, based on the monomers.

The polymerization temperature may be from about 0 to 130° C. The temperature range from 30 to 100° C. is preferred.

The volume fraction of the soft phase in the solid is of decisive importance with regard to the mechanical properties. According to the invention, the volume fraction of the soft phase composed of diene and vinylaromatic sequences is from 60 to 95, preferably from 70 to 90, particularly preferably from 80 to 90, % by volume. The A blocks formed from the vinylaromatic monomers form the hard phase, whose volume fraction accordingly accounts for from 1 to 40, preferably from 10 to 30, particularly preferably from 10 to 20, % by volume.

It should be noted that there is no strict agreement between the abovementioned ratios of vinylaromatic compound and diene, the abovementioned limits of the phase volumes and the composition which results from the novel ranges of the glass transition temperature, since these are in each case numerical values rounded to complete tens. Rather, this might be only accidentally the case.

The volume fraction of the two phases can be measured by means of high-contrast electron microscopy or solid-state NMR spectroscopy. The amount of the vinylaromatic blocks can be determined after osmium degradation of the polydiene fraction by precipitation and weighing. The future phase ratio of a polymer can also be calculated from the amounts of monomers used if polymerization is allowed to go to completion each time.

For the purposes of the present invention, the block copolymer is uniquely defined by the quotient of the volume fraction in percent of the soft phase formed from the B/S blocks and the fraction of diene units in the soft phase, which for the styrene/butadiene combination is from 25 to 70% by weight.

The glass transition temperature ($T_g$) is influenced by the random incorporation of the vinylaromatic compounds into the soft block of the block copolymer and the use of Lewis bases during the polymerization. The glass transition temperature of the total copolymer is preferably from −50° C. to +25° C., preferably less than 0° C.

The molecular weight of the S block is preferably from 1000 to 200,000, in particular from 3000 to 80,000 [g/mol]. Within a molecule, S blocks may have different molar masses.

The molecular weight of the B/S block is usually from 2000 to 250,000 [g/mol]; values of from 5000 to 150,000 [g/mol] are preferred.

As in the case of the S block, the B/S block, too, may assume different molecular weight values within a molecule.

The coupling center X is formed by the reaction of the living anionic chain ends with a bifunctional or polyfunctional coupling agent. Examples of such compounds are to be found in U.S. Pat. Nos. 3,985,830, 3,280,084, 3,637,554 and 4,091,053. For example, epoxidized glycerides, such as epoxidized linseed oil or soybean oil, are preferably used; divinylbenzene is also suitable. Especially for the dimerization, dichlorodialkylsilanes, dialdehydes, such as terephthalaldehyde, and esters, such as ethyl formate or benzoate, are suitable.

Preferred polymer structures are S-B/S-S, X-[-B/S-S]$_2$ and Y-[-B/S-S]$_2$, where the random block B/S in turn can be divided into blocks B1/S1–B2/S2–B3/S3-. . . The random block preferably consists of from 2 to 15, particularly preferably from 3 to 10, random part-blocks. The division of the random block B/S into a very large number of part-blocks Bn/Sn has the decisive advantage that, even in the case of a composition gradient within a part-block Bn/Sn, as can be avoided only with difficulty, in the anionic polymerization under practical conditions, the B/S block as a whole behaves like a virtually perfect random polymer. It is therefore possible to add less than the theoretical amount of Lewis base, which increases the proportion [lacuna] 1,4-diene linkages, decreases the glass transition temperature $T_g$ and reduces the susceptibility of the polymer to crosslinking. A larger or a smaller amount of the part-blocks can be provided with a high diene content. As a result of this, the polymer retains a residual toughness even below the glass transition temperature of the predominant B/S blocks and does not become completely brittle.

All abovementioned weight and volume data are based on the monomer combination butadiene/styrene. However, these data can readily be converted to other monomers technically equivalent to styrene and butadiene.

The block copolymers can be worked up by protonating the carbanions with an alcohol, such as isopropanol, acidifying the reaction mixture, for example with a mixture of $CO_2$ and water, and removing the solvent. The block copolymers may contain antioxidants and antiblocking agents.

Mixtures of the above impact modifiers may also be used.

The novel molding materials may contain, as a further component (component F), also conventional additives and processing assistants. The amount of these additives is in general not more than about 60, preferably not more than about 50, in particular not more than about 30, % by weight, based on the total weight of the components A to E.

Examples of the additives are heat stabilizers and light stabilizers, lubricants and mold release agents, colorants such as dyes and pigments, in conventional amounts. Further additives are reinforcing agent s, such as glass fibers, carbon fibers, aromatic polyamide fibers and/or fillers, gypsum fibers, synthetic calcium silicates, kaolin, calcined kaolin, wollastorite, talc and chalk.

Lubricants, such as polyethylene wax, are also suitable additives.

Carbon blacks or titanium dioxide can be used, for example, as pigments. When $TiO_2$ is used, the mean particle size is as a rule from about 50 to 400 nm, in particular from about 150 to 240 nm. Rutiles and anatase, which may be coated with metal oxides, for example aluminas, silicas, oxides of zinc or siloxanes, are used industrially.

The carbon blacks used should be microcrystalline, finely divided carbons (cf. Kunststofflexikon, 7th edition 1989). Suitable examples are furnace blacks, acetylene blacks, gas blacks and thermal blacks obtained by thermal p reparation. The particle sizes are preferably from about 0.01 to 0.1 $\mu$m and the surface areas from about $10^2$ to $10^4$ $m^2/g$ (BET/ASTM D 3037), or from about $10^2$ to $10^3$ ml/100 g in the case of DBP absorptions (ASTM D 2414).

The novel molding materials are expediently prepared by mixing the components at from 250 to 320° C. in a conventional mixing apparatus, for example a kneader, a Banburry [sic] mixer or a single-screw extruder, preferably a twin-screw extruder. Thorough mixing is necessary for obtaining a very homogeneous molding material. The sequence in which the components are mixed may be varied; two or, if required, a plurality of components may be premixed or all components may be mixed together.

Moldings which are flame retardant, do not tend to drip flaming particles in the fire test according to UL 04 and furthermore have very good melt stability can be produced from the novel molding materials, for example by injection molding or extrusion. The novel molding materials are very suitable for the production of shaped articles of all kinds, for example by injection molding or extrusion. They can furthermore be used for the production of films and semifinished products by the thermoforming or blow molding method.

The examples which follow illustrate the invention.

EXAMPLE

Preparation of Thermoplastic Molding Materials

Novel molding materials 1 to 5 are prepared using the components A to F listed below and are compared with the comparative molding materials V1 to V5 in terms of their characteristic properties.

Component A)

Poly-2,6-dimethyl-1,4-phenylene ether having an average molecular weight ($M_w$) of 40,000 g/mol.

Component $B_1$

High impact polystyrene containing 9% by weight of polybutadiene and having cellular particle morphology and a mean particle size of the soft component of 1.9 $\mu$m. The VN of the hard matrix was 80 ml/g (0.5% strength in toluene at 23° C.).

Comonent $B_2$

High impact polystyrene containing 11% by weight of polybutadiene and having cellular particle morphology and a mean particle size of the soft component of 3.5 $\mu$m. The VN of the hard matrix was 80 ml/g (0.5% strength in toluene at 23° C.).

Component C)

Resorcinol diphenyl phosphate, e.g. Fyroflex® RDP (Akzo)

Component D)

$D_1$: Copolymer comprising 60% by weight of acrylamide and 40% by weight of sodium acrylate, characterized by a viscosity of 3.6 mPas, measured in 0.1% strength aqueous solution at 25° C.

$D_2$: Polyacrylamide, characterized by a viscosity of 4.1 mPas, determined in 0.1% strength aqueous solution.

$D_3$: Polystyrene, $M_w$=1,600,000 g/mol, $M_w/M_n$=1.8; GPC,PS-standards, for comparative experiments.

$D_4$: Polyethylene $M_w$=1,300,000 g/mol; for comparative experiments.

Component E)

SEBS block rubber Kraton G 1650 (Shell AG).

Component F)

Black Pearls 880 carbon black (as 15% strength batch in polystyrene, VN=80 ml/g 0.5% strength in toluene at 23° C.).

Preparation of the Thermoplastic Molding Materials

The components A) to F) were mixed in a twin-screw extruder (ZSK 30 from Werner & Pfleiderer) at 280° C., extruded, cooled and granulated.

The dry granules were processed at from 260 to 280° C. to give circular discs, flat bars for the UL 94 test and standard small bars.

The damaging energy $W_s$ was determined according to DIN 53 443 at 23° C. The heat distortion resistance of the samples was determined by means of the Vicat softening temperature, determined according to DIN 53 460, with a force of 49.05 N and a temperature increase of 50 K per hour, using standard small bars.

The flame retardance and the dripping behavior are determined according to UL 94 on 1/16" thick bars, the stated burning times being the sum of the burning times of both flame applications.

The compositions and properties of the thermoplastic molding materials are listed in Table 1.

TABLE 1

| Molding material No. | V1 | 1 | 2 | 3 | V2 | V3 | V4 | V5 | 4 | 5 |
|---|---|---|---|---|---|---|---|---|---|---|
| Component [% by wt.] | | | | | | | | | | |
| A | 40 | 39.1 | 38.3 | 38.3 | 39.1 | 38.3 | 38.3 | 32 | 30.5 | 30.5 |
| B1 | 47 | 46.0 | 44.9 | 44.9 | 46.0 | 44.9 | 44.9 | 44.3 | 42.0 | 42.0 |
| B2 | — | — | — | — | — | — | — | 2.4 | 2.4 | 2.4 |
| C | 10 | 10 | 10 | 10 | 10 | 10 | 10 | 14 | 14 | 14 |
| D1 | — | 2 | 4 | — | — | — | — | — | 4 | — |
| D2 | — | — | — | 4 | — | — | — | — | — | 4 |
| D3 | — | — | — | — | 2 | 4 | — | — | — | — |
| D4 | — | — | — | — | — | — | 4 | — | — | — |
| E | 3 | 2.9 | 2.8 | 2.8 | 2.9 | 2.8 | 2.8 | 4 | 3.8 | 3.8 |
| F | — | — | — | — | — | — | — | 3.3 | 3.3 | 3.3 |
| Ws [Nm] | 34 | 33 | 34 | 32 | 32 | 32 | 27 | 24 | 23 | 23 |
| Vicat B [° C.] | 111 | 110 | 110 | 109 | 108 | 107 | 109 | 94 | 91 | 90 |
| UL 94 Classification | V-2 | V-1 | V-0 | V-0 | V-2 | V-1 | V-1 | V-2 | V-1 | V-1 |
| UL 94 Burning time [s] | 71 | 57 | 42 | 41 | 83 | 95 | 146 | 154 | 89 | 93 |
| Bars dripped | 5 | 0 | 0 | 0 | 4 | 0 | 0 | 5 | 0 | 0 |

The experiments demonstrate the high efficiency of the novel antidrip agents. Using the components $D_1$ and $D_2$ as antidrip agents, it is possible to prepare thermoplastic molding materials which have a clearly superior property profile.

We claim:

1. A flame-retardant thermoplastic molding material containing

A) at least one polyphenylene ether,

B) at least one vinylaromatic polymer and

C) at least one flameproofing agent, which furthermore comprises

D) as an antidrip agent, a high molecular weight polymer having a viscosity of more than about 1.5 mPas, measured in 0.1% strength aqueous solution at 25° C., which is selected from the group consisting of polyacrylamide and copolymers of acrylamide with up to 95% by weight, based on the total weight of the copolymer of at least one monomer selected from the group consisting of acrylic acid, methacrylic acid, styrenesulfonic acid, ethylenesulfonic acid and the salts thereof, dimethylaminoethyl methacrylate, dimethylaminoethyl acrylate and the hydrochlorides thereof and diallyl dimethylammonium chloride.

2. A molding material as claimed in claim 1, containing

A) from about 5 to about 97.5% by weight of polyphenylene ether,

B) from about 1 to about 93.5% by weight of styrene polymer,

C) from about 1 to about 20% by weight of flameproofing agent,

D) from about 0.5 to about 25% by weight of antidrip agent,

E) from 0 to about 50% by weight of impact modifier, and

F) from 0 to about 60% by weight of conventional additives.

3. A molding material as claimed in claim 1, wherein the flameproofing agent is selected from phosphine oxides, organic monophosphates and organic oligophosphorus compounds and mixtures thereof.

4. A fiber, film or molding produced from a molding material as claimed in any of claims 2, 3 or 1.

* * * * *